US006896144B2

(12) United States Patent
Young et al.

(10) Patent No.: US 6,896,144 B2
(45) Date of Patent: May 24, 2005

(54) FILTRATION AND SEPARATION APPARATUS AND METHOD OF ASSEMBLY

(75) Inventors: Stephen G. Young, Chicopee, MA (US); Yevgeniy Margolin, Medfield, MA (US)

(73) Assignee: Innovative Microplate, Chicopee, MA (US)

( * ) Notice: Subject to any disclaimer, the term of this patent is extended or adjusted under 35 U.S.C. 154(b) by 31 days.

(21) Appl. No.: 10/179,099

(22) Filed: Jun. 25, 2002

(65) Prior Publication Data

US 2002/0195386 A1 Dec. 26, 2002

Related U.S. Application Data

(60) Provisional application No. 60/300,066, filed on Jun. 25, 2001.

(51) Int. Cl.[7] .......................... B01D 29/00; B01L 11/00

(52) U.S. Cl. ....................... 210/477; 210/455; 210/473; 422/101; 220/780

(58) Field of Search ................................ 210/455, 473, 210/232, 477, 321.75; 422/99–104; 220/780, 783, 789

(56) References Cited

U.S. PATENT DOCUMENTS

| | | | | | |
|---|---|---|---|---|---|
| 3,319,792 | A | * | 5/1967 | Byrne et al. | 210/238 |
| 4,427,415 | A | | 1/1984 | Cleveland | 436/57 |
| 4,526,690 | A | | 7/1985 | Kiovsky et al. | 210/335 |
| 4,704,255 | A | | 11/1987 | Jolley | 422/101 |
| 4,927,604 | A | | 5/1990 | Mathus et al. | 422/101 |
| 4,948,442 | A | | 8/1990 | Manns | 156/73.1 |
| 5,047,215 | A | | 9/1991 | Manns | 422/101 |
| 5,096,672 | A | * | 3/1992 | Tervamaki et al. | 422/102 |
| 5,108,704 | A | | 4/1992 | Bowers et al. | 422/70 |
| 5,116,496 | A | | 5/1992 | Scott | 210/232 |
| 5,319,436 | A | | 6/1994 | Manns et al. | 356/246 |
| 5,326,533 | A | | 7/1994 | Lee et al. | 422/101 |
| 5,457,527 | A | | 10/1995 | Manns et al. | 356/246 |
| 5,939,024 | A | | 8/1999 | Robertson | 422/101 |
| 6,027,694 | A | * | 2/2000 | Boulton et al. | 422/102 |
| 6,391,241 | B1 | | 5/2002 | Cote et al. | 264/153 |

* cited by examiner

*Primary Examiner*—W. L. Walker
*Assistant Examiner*—Krishnan S Menon
(74) *Attorney, Agent, or Firm*—Cantor Colburn LLP

(57) ABSTRACT

A filtration apparatus having a plurality of sample wells comprises an upper plate comprising a plurality of upper wells, a lower plate comprising a plurality of lower wells disposed in flexible communication with each other, and a ratcheting mechanism disposed at interfaces of the upper wells and the lower wells. A method for assembling the filtration apparatus comprises supporting the lower plate, disposing a filter medium in the lower well, disposing the upper plate at the lower plate such that the lower wells substantially register with the upper wells, and compressing the upper plate onto the lower plate to form an interference fit between the lower well and the upper well.

20 Claims, 3 Drawing Sheets

FILTRATION AND SEPARATION APPARATUS AND METHOD OF ASSEMBLY

CROSS REFERENCE TO RELATED APPLICATION

This application claims the benefit of the filing date of U.S. Provisional Patent Application Ser. No. 60/300,066 filed Jun. 25, 2001, the entire content of which is incorporated herein by reference.

BACKGROUND

This disclosure relates to devices for performing assay procedures utilizing separation processes, and, more particularly, to a filtration apparatus having a plurality of sampling wells and a method of assembling the same.

Individual and multi-well filtration and titration apparatuses are utilized in a variety of biological and chemical and industrial assay procedures. In such procedures, a sample can be collected on a filter medium for subsequent analysis, or an impurity can be removed from a liquid by being collected on a filter medium and the filtrate collected and analyzed. In either case, various methods exist by which the filter medium can be maintained in position in the sampling well.

One such method includes compression-fitting the medium in the well, which may enable a sample to seep between the compression-fitted surfaces. In an application in which an analysis of filtered sample retained on the membrane is made by a visual method (e.g., luminometry, fluorescence), some of the sample may escape detection, thereby causing the final analysis to be inaccurate. Another method of maintaining the filter medium in place includes bonding a unitary piece of filter medium material at the rim edges of adjacently positioned wells with heat or adhesive or by ultrasonic welding. Because the portions of the filter medium that correspond to each well are in physical communication with each other, the possibility of "cross-talk," or fluid communication between each well through the filter medium material, exists and poses a cross-contamination threat. A third method of assembly requires the upper well plate and the lower plate to be used as a punch and die in the cutting of discs from a unitary sheet of membrane placed between the plates and a secondary step of bonding the upper and lower plate thereby encapsulating the membrane. This method relies on extremely high tolerance injection molded upper and lower plates relative to well centers and has limitations relative to the media which can be cut. Since the filter material is not discretely separated during the manufacturing of the apparatus, there remains the probability of cross-talk between wells of the multiwell filter device. In applications in which contamination between wells occurs, false or inaccurate sample readings may be obtained. Another method incorporates the inserting of a lower plate containing discs of material into an injection mold and the insitu molding of an upper plate into the lower plate. In this technique, no compensation is provided for the differential shrinkage between the inserted lower plate and the upper plate molded around or into it. This leads to a substantial internal stress, which can cause warpage, and stress cracking. Therefore there are numerous limitations in terms of material selections, product design and flatness tolerances.

What is needed in the art is a filtration apparatus that retains a discrete filter medium element securely in a sampling well while reducing the potential for obtaining inaccurate sample readings and eliminating the potential for cross-contamination in a wide selection of filter media, materials of construction, and design configurations.

SUMMARY

Disclosed herein is a filtration apparatus and a method of assembling a filtration apparatus. The filtration apparatus has a plurality of sample wells and comprises an upper plate comprising a plurality of upper wells, a lower plate comprising a plurality of lower wells disposed in flexible communication with each other, and a ratcheting mechanism disposed at interfaces of the upper wells and the lower wells. Each of the lower wells may receive a filter medium or any other material suitable for a specific laboratory assay. The ratcheting mechanism retains the upper wells and the lower wells in a pre-defined coaxial relationship.

A method for assembling the filtration apparatus comprises supporting the lower plate, disposing a filter medium in the lower well, disposing the upper plate at the lower plate such that the lower wells substantially register with the upper wells, and compressing the upper plate onto the lower plate to form an interference fit between the lower well and the upper well, the interference fit being effected by the ratcheting mechanism disposed at the engaging surfaces of the upper well and the lower well. The filter medium can be heat-sealed or ultrasonically bonded to the bottom surface of the upper plate, in order to further enhance the quality of the seal.

BRIEF DESCRIPTION OF THE DRAWINGS

Referring now to the drawings, which are meant to be exemplary and not limiting, and wherein like elements are numbered alike.

DETAILED DESCRIPTION

Disclosed herein is a filtration apparatus for filtration and/or titration applications and a method of assembling an upper plate and a lower plate to form the filtration apparatus. Applications in which the apparatus may be used typically involve the assaying of collected material utilizing methods of analysis that include, but are not limited to, liquid scintillation counting, radiography, luminometry, and the like. A sample to be assayed is received in an upper well of the apparatus. Filtrate is communicated through a filter medium disposed in a lower well at a lower end of the upper well, and at least a portion of the suspended particulate material in the sample is collected on the filter medium. Analysis is made of either or both the collected material and the filtrate to determine the assay.

The filtration apparatus comprises an upper plate having a plurality of upper wells and a lower plate having a plurality of lower wells that correspond to the upper wells. Each upper well is received in a corresponding lower well and retained therein. A ratcheting mechanism disposed on the outer wall of the wells of the upper plate and the corresponding inner wall of the wells of the lower plate facilitates the engagement of the upper and lower wells and provides constant positive pressure exerted on the filter medium. The positive pressure exerted between the surfaces of the upper and lower wells and the filter medium between them prevents or at least reduces the possibility of liquid seepage from the upper well, around the filter medium, and to the lower well or to another well. The wells of the lower plate are disposed in flexible and extendable communication with each other to allow for the fitting of the lower plate to the upper plate, thereby minimizing the need for tight manufacturing tolerances of injection molded upper and lower plates.

Figure 1:
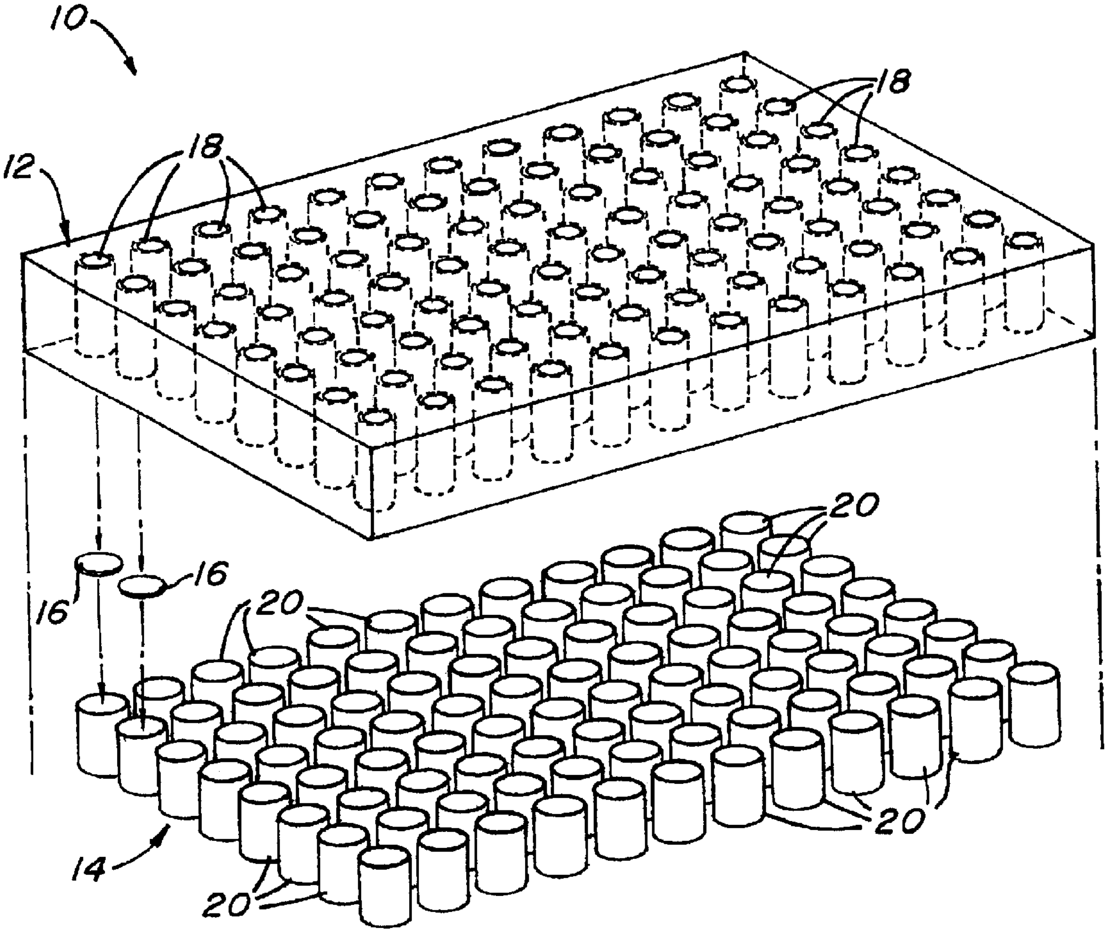
FIG. 1 is a perspective exploded view of a filterplate.

Referring to FIG. 1, one exemplary embodiment of a filtration apparatus is a filterplate, which is shown at 10. Filterplate 10 comprises individual filtration wells defined by an upper plate 12 and a lower plate 14 assembled with a plurality of discrete filter mediums 16. Filter mediums 16 may be capable of general filtration, microfiltration, ultrafiltration, or reverse osmosis. Although filter mediums 16 are hereinafter described as being of the type that effect the passage of a liquid filtrate therethrough, filter mediums 16 may comprise lenses, films, and the like to effect the filtering of electromagnetic radiation (e.g., visible light, infrared radiation, laser, and ultraviolet light). The individual filtration wells are adjacently positioned and maintained in an array format to facilitate the efficient and rapid processing of multiple samples and to allow for the isolation of each sample. Upper plate 12 comprises a plurality of upper wells 18, and lower plate 14 comprises a corresponding plurality of lower wells 20. Each lower well 20 is disposed in flexible communication with its adjacently-positioned lower well 20 to enable each lower well 20 to register with and receive its corresponding upper well 18.

Figure 2:
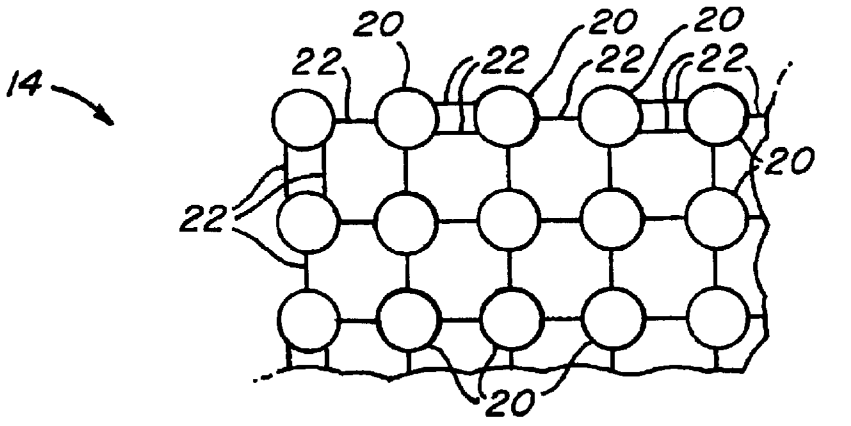
FIG. 2 is a plan view of a lower plate of a filterplate.

Referring to FIG. 2, a portion of lower plate 14 is shown. The array format of the sample wells includes lower wells 20 positioned adjacent to any one lower well 20. In one embodiment as shown, two, three, or four lower wells 20 may be disposed adjacent to one lower well 20. Each lower well 20 is furthermore maintained in flexible and extendable communication with other lower wells 20 via flexible elements (e.g., flexors 22) that provide the structural integrity of lower plate 14, as well as the communication between wells 20. It should be understood by those of skill in the art, however, that the incorporation of flexors 22 into a structure is not limited to a lower plate having a plurality of lower wells. Flexors 22 may, in fact, be disposed between any two or more structures to facilitate the flexing of the structure. Such a structure and its attendant flexors 22, e.g., lower plate 14, as defined by its wells 20 and flexors 22, may be formed in an injection molding process such that the structures and flexors 22 are integrally formed.

In their pre-stressed states, flexors 22 comprise arcuately-shaped resilient elements that extend between adjacent lower wells 20. The elements exhibit elastic behavior that allows them to sufficiently flex upon being acted upon by a force. Forces applied to flexors 22 facilitate the bending of each flexor 22, and the arcuate shape enables the return of each flexor 22 to its pre-stressed configuration upon removal of the applied force. The assembly of a plurality of lower wells 20 connected by flexors 22 into lower plate 14 enables lower plate 14 to flex (i.e., bend out of the plane of lower plate 14, bend in the plane of lower plate 14, bend torsionally, or move in a combination of the foregoing manners) to accommodate simultaneous forces exerted on lower plate 14 from different directions.

Figure 3:
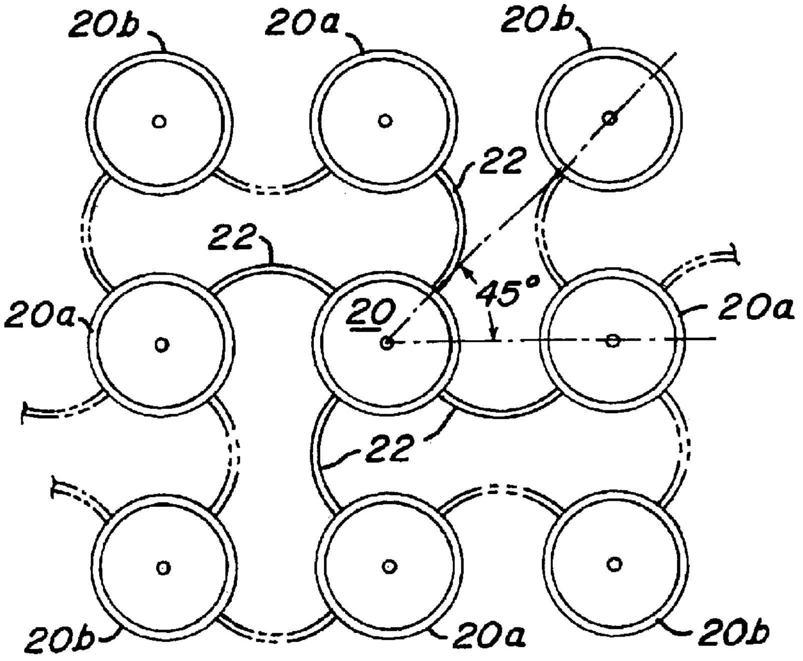
FIG. 3 is a plan view of a group of wells of a lower plate.

In FIG. 3, the connection of lower wells 20 via flexors 22 can be seen. Although a reference lower well 20 is shown as not being positioned at the edge or corner of the lower plate and as having eight surrounding lower wells **20*a*, 20*b*, the reference lower well 20 may be positioned at the edge or corner of the lower plate and have fewer surrounding lower wells 20*a*, 20*b*. In an embodiment in which lower wells 20*a* are arranged at right angles to the reference lower well 20, lower wells 20*b* are positioned equiangularly between each lower well 20*a* (i.e., at about forty-five degree angles relative to the reference lower well 20 and any lower well 20*a*). To provide for optimum flexibility of the lower plate, the four flexors 22 extending from the reference lower well 20 to the rectangularly-positioned lower wells 20*a* extend arcuately from the lower well 20 from points that are about ninety degrees apart from each other. The direction in which each flexor 22 extends from a particular lower well (i.e., to the right or to the left) may alternate with reference to the adjacently-positioned lower well throughout the array structure. Upon the exertion of opposing forces that stretch or bend the lower plate in the plane of the lower plate (e.g., the "z" direction) or stretch or bend the lower plate out of the plane (e.g., the "x" or "y" directions), flexors 22 allow for the independent movement of adjacently-positioned lower wells 20** in any direction. Flexors extending from the adjacently positioned lower wells are shown in phantom.

Figure 4:
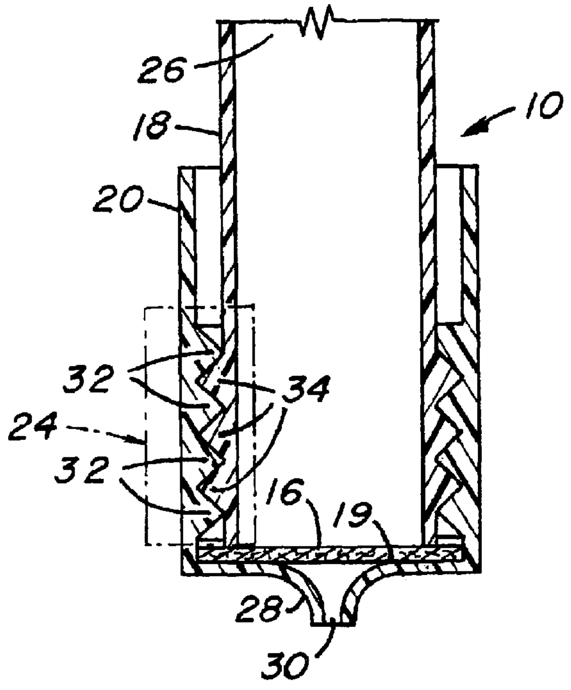
FIG. 4 is a sectional view of the engagement of an upper well and a lower well via a ratcheting mechanism.

Referring to FIG. 4, the engagement of the wells of the upper and lower plates of filterplate 10 are shown. In one exemplary embodiment, the upper and lower plates are configured such that lower well 20 is a female-oriented element that receives the male-oriented upper well 18. Upper well 18 is a tubular structure that comprises at least one wall arranged to define a body having opposingly positioned inlet- and outlet ends. The cross sectional configuration of the body may be of any geometric shape, e.g., square, pentagonal, hexagonal, octagonal, and the like. In one embodiment, however, the body is defined by a single wall arranged to form a cylinder having a round cross section. The inlet end, shown at 26, is open to receive a sample to be filtered, and the outlet end is open to permit the sample to engage filter medium 16 when upper well 18 is received into lower well 20. A compression surface (shown below with reference to FIG. 5) may be defined by the rim edge of the wall of the cylindrical body and may engage filter medium 16.

Lower well 20 is a tubular structure that comprises at least one wall arranged to define a body having opposingly positioned inlet- and outlet ends and a cross sectional geometry that corresponds to upper well 18. The inlet end is open to receive filter medium 16 and the outlet end of upper well 18. The outlet end of lower well 20 includes a base surface 19 having an aperture (e.g., a perforated plate, a mesh structure, or the like) that is capable of facilitating fluid communication from the outlet end to a stem 28 having a duct 30 through which filtrate (not shown) maybe removed from filterplate 10.

Upper well 18 is retained in lower well 20 by means of a ratcheting mechanism 24 disposed at the overlapping portions of lower well 20 and upper well 18. Ratcheting mechanism 24 provides for the secure retention of filter medium element 16 between upper well 18 and base surface 19. Ratcheting mechanism 24, as shown in the embodiment of FIG. 4, is disposed along the outer wall of upper well 18 and the inner wall of lower well 20 and provides a mechanical seal between each upper well 18 and lower well 20 by facilitating the engagement of upper well 18 with lower well 20 without the need for conventional means of attachment (e.g., welding, ultrasonic welding, and the like). The mechanism comprises at least one first engagement surface (e.g., a ridge 32) disposed on the inner wall of the cylindrical body of lower well 20 and at least one second engagement surface (e.g., a ridge 34) disposed on the outer wall of the cylindrical body of upper well 18. Ridges 32, 34 of the ratcheting mechanism disposed on the surfaces of opposing wells 18, 20 are angled such that once engaged, a relatively constant force pulls the upper and lower plates together maintaining the integrity of the seal to the membrane or film entrapped. Ridges 32, 34 may be, furthermore, complementary in structure, triangular in cross section, and circumferentially disposed at the respective facing walls of wells 20, 18. Upon engagement of ridges 32, 34, wells 18, 20 can be maintained in a predefined coaxial relationship.

Figure 5:
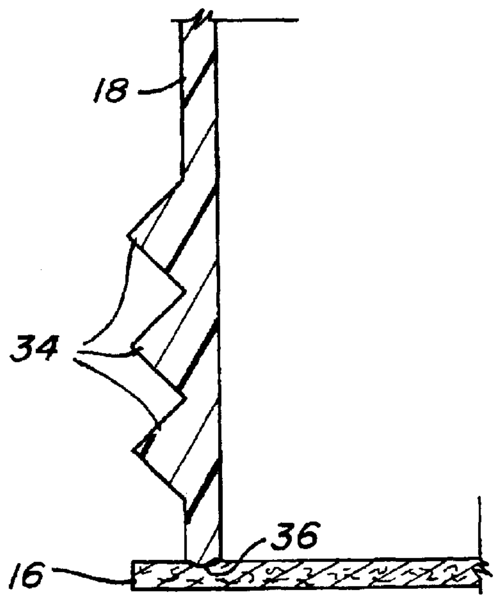
FIG. 5 is a sectional view of a wall of an upper well and its engagement with a filter medium.

Referring now to FIG. 5, a section of the wall of upper well 18 and its engagement with filter medium 16 is shown. As stated above, upper well 18 comprises the compression surface 36 defined by the rim edge of the cylindrical body of upper well 18. Compression surface 36 preferably comprises a raised surface (e.g., a "lip") that extends along the rim edge of upper well 18. The raised surface engages filter medium 16 disposed at the lower well when the filterplate is assembled.

The retention of filter medium 16 within lower well 20 is described with reference to both FIGS. 4 and 5. Filter medium 16 is inserted intermediate lower well 20 and compression surface 36 such that filter medium 16 can be captured between the base end of lower well 20 and compression surface 36 upon assembly of filterplate 10. In one exemplary embodiment, filter medium 16 is pre-cut to fit onto the base end of lower well 20. Various thicknesses of filter mediums are available and are selected based on the particular application. Materials from which filter medium 16 may be fabricated include, but are not limited to, glass fiber, nylon, cellulose, nitrated- or phosphated cellulose, combinations of the foregoing materials, and the like.

The capture of filter medium 16 between the base end of lower well 20 and compression surface 36 is effected by ratcheting mechanism 24. At least one of wells 18, 20 (and its corresponding ridge 32, 34) are fabricated from a non-rigid material, and thus the body portions of at least one of the wells 18, 20 is sufficiently flexible such that upon assembly of filterplate 10, ridges 32 slide over ridges 34 to allow the facing surfaces of each to engage each other and retain upper well 18 in lower well 20 in an interference fit. Alternately, one of ridges 32, 34 circumferentially disposed on one of the walls may comprise a groove or a channel (not shown) configured and dimensioned to receive the opposing ridge. As upper well 18 is inserted into lower well 20, ridges 32, 34 interlock and apply a relatively constant force to maintain the integrity of the interference fit, thereby inhibiting the removal of upper well 18 from lower well 20. Upon continued insertion of upper well 18 into lower well 20, filter medium 16 is trapped between compression surface 36 and the base surface of lower well 20. The biasing of filter medium 16 against the base surface of lower well 20 by the lip of compression surface 36 retains filter medium 16 within lower well 20. When upper well 18 is fully inserted into lower well 20, compression surface 36 maintains a fluid barrier that may be impervious to fluid communication between filter medium 16 and lower well 20 to prevent or substantially inhibit leakage of liquid from upper well 18 around filter medium 16 and through duct 30.

Because ratcheting mechanism 24 enables lower well 20 to be "locked down" at any one of a multitude of discrete points defined by the engagement of ridges 32, 34, and because the lower plate into which lower wells 20 are incorporated is flexible, multiple filter mediums can be utilized in the same well or filter mediums of varying thicknesses can be utilized in the same filterplate 10. In particular, in a ratcheting mechanism 24 in which multiple ridges 32, 34 are disposed on one or both of inner wall of lower well 20 or outer wall of upper well 18, flexors 22 allow independent movement of the individual lower wells 20 such that each can be "ratcheted" to corresponding upper wells 18 to varying degrees. Such variations enable filter mediums 16 (or multiple layers of filter mediums) to be accommodated in adjacent wells and securely retained therein via ratcheting mechanism 16 and compression surface 36.

The compression surface 36 of the upper plate may have a secondary compression ring added to further enhance the integrity of the seal to the membrane in the finished assembly of the filterplate. This secondary compression ring may be "V" shaped in order to concentrate exerted pressure from the ratchet mechanism on the membrane.

The upper plate of the filterplate may be fabricated from any suitable material. Suitable materials may be either rigid or non-rigid and include, but are not limited to, thermoplastics (e.g., polypropylenes, polyethylenes, polystyrenes, polystyrene elastomers, fluoropolymers, fluoroelastomers, variations and modified versions of the foregoing materials, combinations of the foregoing materials, and the like). The flexibility imparted to lower plate 14, however, owes in part to the fabrication thereof from preferably a non-rigid plastic such as polypropylene, polyethylene, polystyrene, polystyrene elastomer, fluoropolymer, fluoroelastomer, variations and modified versions of the foregoing materials, combinations of the foregoing materials, and the like. Fabrication of at least lower plate 14 from such materials allows for the manufacture of filterplate structures without requiring tight tolerance limits. Furthermore, fabrication of lower plate 14 from a non-rigid material allows for its flexure and thus the assembly of the filterplate even when lower wells 20 are misaligned with the upper wells. Upper plate 12 and lower plate 14 may, furthermore, be fabricated from dissimilar materials.

In another exemplary embodiment, a lower plate can comprise a plurality of wells disposed in flexible communication with each other via flexors as described above with ridges and grooves, or any type of device associated with a ratcheting mechanism. Utilization of a proposed flexible lower plate in an overmolding assembly method enables the problems associated with conventional insert molding such as warpage, deflection, and stress cracking to be overcome. This is achieved by virtue of synchronized change in geometrical dimensions between the overmolded part and the flexible lower plate thus reducing or eliminating the cause for internal stress. Another advantage of utilization of the flexible lower plate comprising flexors and the ratcheting mechanism is the ability to overmold dissimilar materials that would not normally bond together. In the described embodiment, molten plastic that forms upper body of the described multiwell apparatus device will flow in and fill ridges and grooves of the ratcheting mechanism of the lower plate and thus create a mechanical interlock (e.g., a hermetic seal) between upper and lower components securely holding them together.

Referring now to FIGS. 1, 2, and 3, the assembly of filterplate 10 may be effected by the "snap-fitting" of lower plate 14 onto upper plate 12 with filter medium 16 disposed in the lower wells 20 of lower plate 14. To assemble filterplate 10, lower plate 14 is supported such that each lower well 20 can be interfaced with a corresponding upper well 18. Filter mediums 16, which may be in the form of pre-cut sheets dimensioned to correspond to the cross sectional geometry of the tubular body of each lower well 20, are inserted into each lower well 20. Upper plate 12 is press-fitted onto lower plate 14 such that lower wells 20 register with the outlet ends of upper wells 18, thereby trapping filter mediums 16 in lower wells 20. When upper plate 12 is pressed onto lower plate 14, the ridges that comprise the ratcheting mechanisms on each corresponding upper well 18 and lower well 20 engage to lock upper plate 12 and lower plate 14 together. Compression of plates 12, 14 effects the sealing of wells 18, 20 with filter mediums 16.

The filtration apparatus described herein can be employed in assay procedures with minimal opportunity for the seepage of sample around the filter medium. By using a ratcheting mechanism to secure a lower well to an upper well while trapping a filter medium therebetween, the opportunity for the removal, inadvertent or otherwise, of the lower well from the upper well is virtually eliminated. The opposingly-positioned ridges or grooves provide for a secure, sound connection between the components, particularly the upper well, the filter medium, and the lower well. With a secure, sound connection maintained, the structural integrity of the filtration apparatus is maintained and more accurate analyses of either filtered material or filtrate can be obtained.

Furthermore, by providing a filterplate assembly defined by a plurality of upper wells disposed in an upper plate and a plurality of flexibly linked lower wells disposed in a lower plate, a plurality of discrete filter mediums can provide less expensive, simultaneous, and rapid processing of samples for filtrations or titrations for biotechnical or chemical assay procedures or for the synthesis of biological or chemical entities. Because of the flexibility imparted to the lower plate via the use of non-rigid manufacturing materials and the incorporation of flexible members linking adjacent lower wells, misalignments of the lower wells and the upper wells can be compensated for, thereby allowing for the manufacture of the components of the filterplate assembly without requiring adherence to strict manufacturing tolerances related to the upper and lower well centers.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A filtration apparatus having a plurality of sample wells, said filtration apparatus comprising:

an upper plate comprising a plurality of upper wells;

a lower plate comprising a plurality of lower wells disposed in flexible communication with each other, each of said lower wells having a base surface for receiving a corresponding upper well; and a ratcheting mechanism in which multiple ridges representing distinct depth of engagement are disposed at at least one surface of interfaces of said upper wells and said lower wells, said ratcheting mechanism being configured to retain said upper wells and said lower wells in a pre-defined coaxial relationship when said lower wells are received at said corresponding upper wells.

2. The filtration apparatus of claim 1, wherein said flexible communication between said lower wells is maintained via flexible members disposed between said lower wells.

3. The filtration apparatus of claim 1, wherein said ratcheting mechanism comprises first engagement surfaces disposed on inner walls of said lower wells and second engagement surfaces disposed on outer walls of said upper wells, said first and second engagement surfaces being circumferentially disposed on said respective walls.

4. The filtration apparatus of claim 3, wherein said engagement surfaces are triangular in cross sectional geometry.

5. The filtration apparatus of claim 1, further comprising a compression surface disposed at a rim edge of said upper well.

6. The filtration apparatus of claim 1, wherein said base surfaces of said lower wells comprise mesh structures.

7. The filtration apparatus of claim 6, further comprising a filter medium that may be capable of general filtration, microfiltration, ultrafiltration, or reverse osmosis disposed in each of said lower wells at said base structures.

8. The filtration apparatus of claim 7, wherein said filter mediums are maintained against said base surfaces by an interference fit effected by said ratcheting mechanism.

9. The filtration apparatus of claim 1, wherein said lower plate is fabricated from a non-rigid material.

10. The filtration apparatus of claim 9, wherein said non-rigid material is selected from the group consisting of polypropylenes, polyethylenes, polystyrenes, polystyrene elastomers, fluoropolymers, fluoroelastomers, variations and modified versions of the foregoing materials, combinations of the foregoing materials, and the like.

11. The filtration apparatus of claim 1, wherein said upper plate and said lower plate are fabricated from dissimilar materials such that cross talk between said upper wells and said lower wells is reduced.

12. The filtration apparatus of claim 2, wherein said flexible members each comprise an element disposable between two lower wells, said element being integrally formed with said two lower wells and providing a flexible connection between said two lower wells.

13. The filtration apparatus of claim 12, said element having opposing ends, each of said ends being integrally disposed at said two lower wells.

14. The filtration apparatus of claim 13, wherein said element is molded with said two lower wells.

15. The filtration apparatus of claim 1 further including among at least one of said plurality of upper wells and said plurality of lower wells:

arcuately shaped flexible members each having concentrically arcuately shaped edges disposed between each of said wells, said flexible members being bendable in each of the x, y and z directions thereby providing for movement of each of said wells in the x, y, and z directions with respect to adjacent wells.

16. The filtration apparatus plate of claim 15, wherein said flexible members are arcuately formed.

17. A method for assembling a filtration apparatus comprising an upper plate of tubular upper wells and a lower plate of tubular lower wells, said method comprising:

supporting said lower plate;

disposing a filter medium in said lower well;

disposing said upper plate at said lower plate such that said lower wells substantially register with said upper wells;

compressing said upper plate onto said lower plate to form an interference fit between said lower well and said upper well, said interference fit being effected by a ratcheting mechanism disposed at engaging surfaces of said upper well and said lower well wherein said ratcheting mechanism includes multiple ridges at at least one surface of said engaging surfaces; and selecting an engagement depth of the upper plate to the lower plate by engaging one of the multiple ridges of the ratcheting mechanism.

18. The method of claim 17, wherein said lower wells disposed in flexible communication with each other facilitating self-compensation for misalignment of said upper plate and said lower plate during said compressing thereby forming a tight seal between said lower wells and said upper wells when said upper wells are inserted into said wells.

19. A method for assembling a filtration apparatus as claimed in claim 1, said method comprising:

molding said plurality of lower wells to define said lower plate;

placing a filter medium in each of said lower wells;

placing said lower plate with said filter mediums into a mold for said upper plate defined by a plurality of upper wells;

molding said upper wells of said upper plate to corresponding lower wells of said lower plate, thereby trapping said filter mediums to obtain hermetic seal between said upper wells and said lower wells.

20. The method of claim 19, wherein said upper plate and said lower plate are molded from dissimilar materials.

* * * * *